US011948502B2

(12) United States Patent
Min

(10) Patent No.: US 11,948,502 B2
(45) Date of Patent: Apr. 2, 2024

(54) POWER VOLTAGE SUPPLY CIRCUIT, A DISPLAY DEVICE INCLUDING THE SAME, AND A DISPLAY SYSTEM INCLUDING THE DISPLAY DEVICE

(71) Applicant: SAMSUNG DISPLAY CO., LTD., Yongin-si (KR)

(72) Inventor: Byung Kyou Min, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/143,173

(22) Filed: May 4, 2023

(65) Prior Publication Data

US 2024/0046854 A1 Feb. 8, 2024

(30) Foreign Application Priority Data

Aug. 2, 2022 (KR) ........................ 10-2022-0096403

(51) Int. Cl.
*G09G 3/32* (2016.01)

(52) U.S. Cl.
CPC ......... *G09G 3/32* (2013.01); *G09G 2310/027* (2013.01); *G09G 2320/0626* (2013.01); *G09G 2330/021* (2013.01)

(58) Field of Classification Search
None
See application file for complete search history.

(56) References Cited

U.S. PATENT DOCUMENTS

| | | | | | |
|---|---|---|---|---|---|
| 10,164,534 | B2 | 12/2018 | Hang et al. | | |
| 2012/0146520 | A1* | 6/2012 | Liu | G09G 3/3406 | 315/192 |
| 2012/0223926 | A1* | 9/2012 | Morii | G09G 3/3696 | 345/96 |
| 2015/0261244 | A1* | 9/2015 | Su | G05F 3/02 | 345/212 |

FOREIGN PATENT DOCUMENTS

| | | |
|---|---|---|
| KR | 10-1893287 | 8/2018 |
| KR | 10-2382987 | 3/2022 |
| KR | 10-2424554 | 7/2022 |

* cited by examiner

*Primary Examiner* — Matthew Yeung
(74) *Attorney, Agent, or Firm* — F. Chau & Associates, LLC

(57) ABSTRACT

A power voltage supply circuit for a display device including: a branch node; a voltage converter having an output terminal connected to the branch node, the voltage converter configured to convert an input voltage received from outside, and output a power voltage to the branch node; a first output node connected to the branch node and configured to output the power voltage; a second output node connected to the branch node; and a charge pump connected between the branch node and the second output node and configured to transform the power voltage with different gain values in response to a control signal.

18 Claims, 13 Drawing Sheets

POWER VOLTAGE SUPPLY CIRCUIT, A DISPLAY DEVICE INCLUDING THE SAME, AND A DISPLAY SYSTEM INCLUDING THE DISPLAY DEVICE

CROSS-REFERENCE TO RELATED APPLICATION

This application claims priority under 35 U.S.C. § 119 to Korean Patent Application No. 10-2022-0096403, filed Aug. 2, 2022, the disclosure of which is incorporated by reference herein in its entirety.

TECHNICAL FIELD

The present invention relates to an electronic device, and more particularly, to a power voltage supply circuit, a display device including the same, and a display system including the display device.

DISCUSSION OF RELATED ART

In recent years, performance of computer devices such as mobile phones, smart phones, and wearable devices has rapidly increased. These computer devices are typically operated with power supplied from a battery. As the performance and use of the computer devices continues to increase, power consumption may increase, and consequently, techniques for reducing power consumption are at the forefront of research.

Visualization of information can have a significant impact on the commercial success of computer devices. Therefore, the computer devices may include a display device for displaying an image. The display device may include a display panel including a plurality of pixels and a driver integrated circuit for driving the pixels of the display panel. The display device may further include a power management integrated circuit (PMIC). The PMIC may receive an input voltage from, for example, a battery, generate a plurality of power voltages based on the input voltage, and supply the generated plurality of power voltages to the driver integrated circuit and the display panel.

SUMMARY

Embodiments of the present invention provide a power voltage supply circuit that consumes power with increased efficiency, a display device including the same, and a display system including the display device. For example, the power voltage supply circuit may include a voltage converter, output nodes commonly connected to the voltage converter, and a charge pump connected between one of the output nodes and the voltage converter and having an adjustable gain. By controlling the gain of the charge pump, a variable voltage may be output through one of the output nodes, and a voltage provided from the voltage converter may be output through other output nodes without being regulated. Accordingly, the power voltage supply circuit may efficiently consume power while generating the variable voltage. Accordingly, power consumption of the power voltage supply circuit can be reduced.

An embodiment of the present invention provides a power voltage supply circuit for a display device including: a branch node; a voltage converter having an output terminal connected to the branch node, the voltage converter configured to convert an input voltage received from outside, and output a power voltage to the branch node; a first output node connected to the branch node and configured to output the power voltage; a second output node connected to the branch node; and a charge pump connected between the branch node and the second output node and configured to transform the power voltage with different gain values in response to a control signal.

The power voltage of the branch node is output to the first output node without being regulated.

The power voltage supply circuit further includes: a regulator connected between the charge pump and the second output node and configured to regulate a transformed power voltage and output an additional power voltage to the second output node.

The power voltage supply circuit further includes: a first switch connected between the branch node and the first output node, wherein the first switch is turned on in response to a first output control signal; and a second switch connected between the regulator and the second output node, wherein the second switch is turned on in response to a second output control signal.

The power voltage has a positive voltage level, and the transformed power voltage has a negative voltage level.

The charge pump includes capacitors and switches connected to the capacitors, and each of the switches is turned on or turned off in response to the control signal, and a gain value is adjusted by changing a connection relationship between the capacitors.

An embodiment of the present invention provides a display device including: a display panel; a driver integrated circuit connected to the display panel through a plurality of signal lines and configured to drive the display panel; and a power voltage supply circuit configured to provide power voltages to at least one of the display panel and the driver integrated circuit, wherein the power voltage supply circuit includes: a voltage converter configured to convert an input voltage and output a first power voltage to a branch node; a first output node connected to the branch node to output the first power voltage; a second output node connected to the branch node; and a charge pump connected between the branch node and the second output node and configured to transform the first power voltage with an adjustable gain value, wherein a transformed first power voltage is output as a second power voltage through the second output node.

The second power voltage is supplied to the display panel through the second output node, and the driver integrated circuit adjusts a luminance of the display panel by controlling a gain value of the charge pump to transform a level of the second power voltage.

The driver integrated circuit receives a control signal including data related to the luminance of the display panel from outside, and controls the gain value based on the control signal.

The display panel includes a plurality of pixels connected to the plurality of signal lines, each of the plurality of pixels includes a light emitting diode, and the second power voltage is provided to a first end of the light emitting diode through the second output node.

The first power voltage is provided to a second end of the light emitting diode through the first output node.

The first power voltage has a positive voltage level, and the second power voltage has a negative voltage level.

The driver integrated circuit includes a voltage generator configured to generate a driving voltage of the display device, and the first power voltage is provided to the voltage generator through the first output node.

The power voltage supply circuit includes a power management integrated circuit (PMIC) disposed in an area separated from the driver integrated circuit.

The first power voltage of the branch node is output to the first output node without being regulated.

The power voltage supply circuit further includes a regulator connected between the charge pump and the second output node, wherein the regulator is configured to regulate the transformed first power voltage to generate the second power voltage.

The voltage converter includes a direct current (DC)-DC converter, and the regulator includes a low-dropout (LDO) regulator.

An embodiment of the present invention provides a display system including: a display device; a processor configured to control the display device; and a power voltage supply circuit, wherein the power voltage supply circuit includes: a voltage converter configured to convert an input voltage and output a first power voltage to a branch node; a first output node connected to the branch node and configured to output the first power voltage; a second output node connected to the branch node; and a charge pump connected between the branch node and the second output node and configured to transform the first power voltage with an adjustable gain value, wherein a transformed first power voltage is output as a second power voltage through the second output node, and wherein the first and second power voltages are provided to the display device through the first and second output nodes, respectively.

BRIEF DESCRIPTION OF THE DRAWINGS

The accompanying drawings, which are included to provide a further understanding of the present invention, and are incorporated in and constitute a part of this specification, illustrate embodiments of the present invention, and, together with the description, serve to explain principles of the present invention.

DETAILED DESCRIPTION OF THE ILLUSTRATED EMBODIMENTS

Figure 1:
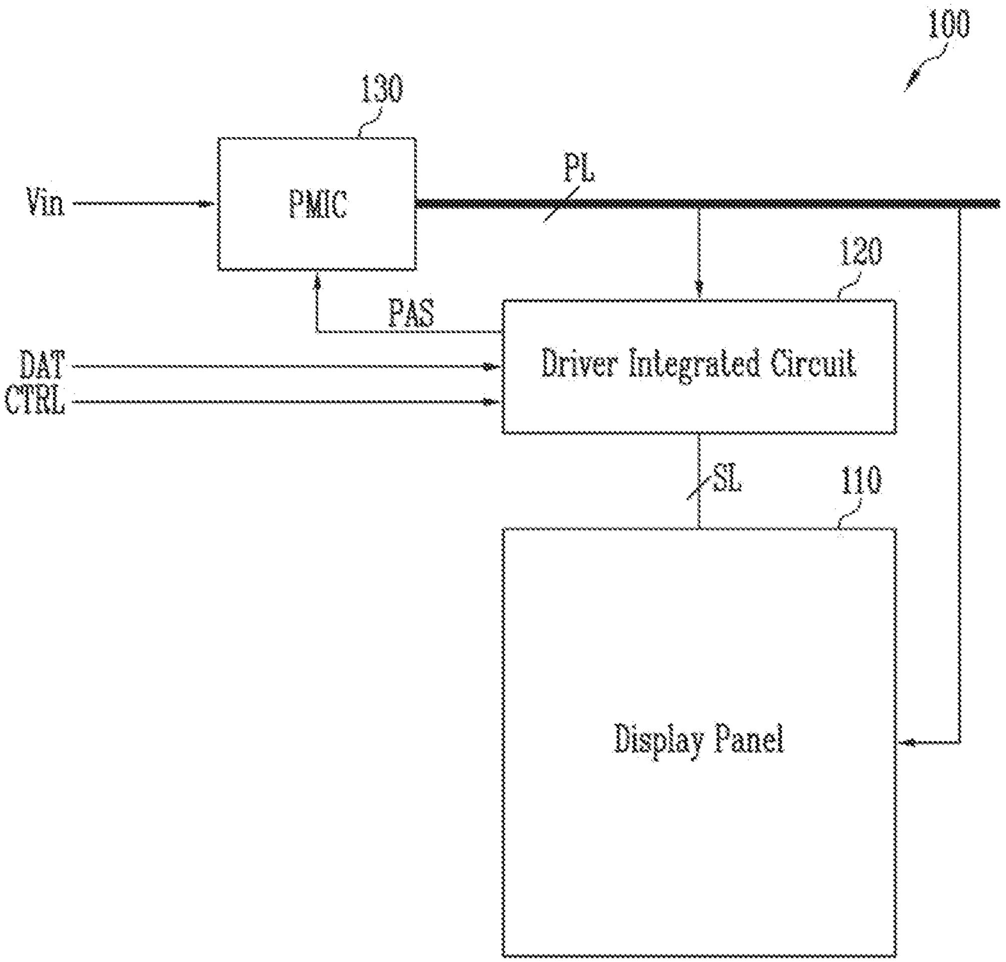
FIG. 1 is a block diagram illustrating a display device according to embodiments of the present invention.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not substantially depart from the spirit and technical scope of the present invention are encompassed in the present invention.

It will be understood that, although the terms “first”, “second”, etc. may be used herein to describe various elements, these elements should not be limited by these terms. These terms are used to distinguish one element from another element. For instance, a first element discussed below could be termed a second element. Similarly, the second element could also be termed the first element. In the present disclosure, the singular expressions are intended to include the plural expressions as well, unless the context clearly indicates otherwise.

It will be further understood that the terms “comprise”, “include”, “have”, etc. used in this disclosure, specify the presence of stated features, integers, steps, operations, elements, components, or combinations thereof but do not preclude the presence or addition of one or more other features, integers, steps, operations, elements, components, or combinations thereof. Features of the present invention and methods of achieving them will become apparent with reference to the embodiments described in detail below in conjunction with the accompanying drawings. However, the present invention is not limited to the embodiments disclosed below and may be implemented in various different forms. In the following description, when a first part is connected to a second part, this includes not only the case where the first part is directly connected to the second part, but also the case where a third part is interposed therebetween and they are electrically connected to each other. In embodiments of the present invention, “connection” between two components may mean to encompass both an electrical connection and a physical connection.

FIG. 1 is a block diagram illustrating a display device according to embodiments of the present invention.

Referring to FIG. 1, a display device 100 (or display system) may include a display panel 110, a driver integrated circuit 120, and a power management integrated circuit (PMIC) 130.

The display panel 110 may be connected to the driver integrated circuit 120 through a plurality of signal lines SL, The display panel 110 may be operated in response to the control of the driver integrated circuit 120.

The driver integrated circuit 120 may be connected to the display panel 110, The driver integrated circuit 120 may receive image data DAT and control signals CTRL from the outside. The driver integrated circuit 120 may display the image data DAT on the display panel 110 in response to the control signals CTRL. For example, the driver integrated circuit 120 may apply grayscale voltages corresponding to the image data DAT to the plurality of signal lines SL, and the display panel 110 may display an image according to the grayscale voltages applied through the plurality of signal lines SL.

A power voltage supply circuit, which may be provided in the form of the power management integrated circuit (PMIC) 130, may supply power voltages to the components of the display device 100 through power lines PL. The power management integrated circuit 130 may receive an input voltage Vin from the outside, for example, an external battery, generate the power voltages using the received input voltage Vin, and supply the generated power voltages through the power lines PL, Since the power management integrated circuit 130 generates relatively high power voltages, the voltage and current inside the power management integrated circuit 130 may be relatively high. Accordingly, the power management integrated circuit 130 may be provided as a component different from the driver integrated circuit 120. In other words, the power management integrated circuit 130 may be a separate component from the driver integrated circuit 120, The power management integrated circuit 130 may be disposed in an area separated from the driver integrated circuit 120.

The power management integrated circuit 130 may receive a power control signal PAS from the driver integrated circuit 120 and adjust at least some of the power voltages output through the power lines PL.

In some embodiments, the display device 100 may be employed in a computer system that operates using power from a battery, such as a portable computer, a mobile phone, a wearable device, and the like. Although the power management integrated circuit 130 is shown as being included in the display device 100 in FIG. 1, this is only an example and the power management integrated circuit 130 may be provided as a component separate from the display device 100, FIG. 2 is a block diagram illustrating an embodiment of a power management integrated circuit of FIG. 1.

Figure 2:
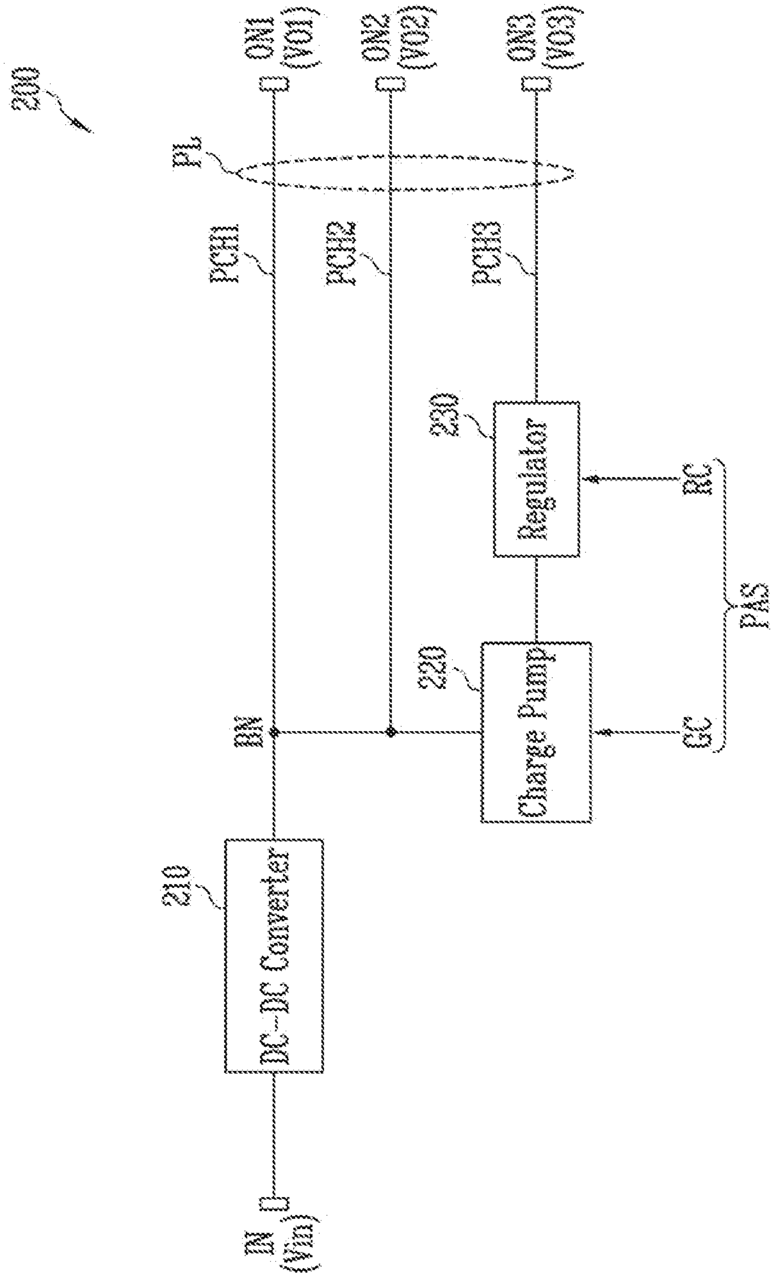
FIG. 2 is a block diagram illustrating an embodiment of a power management integrated circuit of FIG. 1.

Referring to FIG. 2, a power management integrated circuit 200 may include a DC-DC converter 210, a charge pump 220, and a regulator 230.

A voltage converter, which may be provided in the same form as the DC-DC converter 210, may receive the input voltage Vin through an input node IN, The DC-DC converter 210 may have an output terminal connected to a branch node BN, convert the input voltage Vin to generate a power voltage, and output the generated power voltage to the branch node BN, In some embodiments, the DC-DC converter 210 may include a boost converter, a buck converter, or a buck-boost converter.

The DC-DC converter 210 may include at least one inductor as is known in the art. Since the inductor has a relatively large size, a limited number of inductors may be used, particularly in the case of a small display device. For this reason, as shown in FIG. 2, the power lines PL may be commonly connected to one DC-DC converter 210. In this case, when a regulator is provided on each of the power lines PL to level the voltage of the corresponding power line to a required voltage, a relatively large amount of power may be consumed.

According to an embodiment of the present invention, the power management integrated circuit 200 may include one or more power channels that output the power voltage provided to the branch node BN without regulating. As shown in FIG. 2, the power voltage of the branch node BN may be output to a first output node ON1 through a first power channel PCH1 and output to a second output node ON2 through a second power channel PCH2. Accordingly, a first output voltage VO1 output to the first output node ON1 and a second output voltage VO2 output to the second output node ON2 may be substantially the same as the power voltage of the branch node BN.

According to an embodiment of the present invention, the power management integrated circuit 200 may include a third power channel PCH3 that outputs the power voltage provided to the branch node BN to a third output node ON3 through the charge pump 220 and the regulator 230. Accordingly, a third output voltage VO3 output to the third output node ON3 may be varied. The third power channel PCH3 may be commonly connected to the branch node BN together with the first and second powerchannels PCH1 and PCH2.

The first to third power channels PCH1 to PCH3 may be included in the power lines PL of FIG. 1. As such, the first to third output voltages VO1 to VO3 may be provided to the display panel 110 and/or the driver integrated circuit 120.

The charge pump 220 may be connected between the branch node BN and the third output node ON3, and may transform the power voltage of the branch node BN with different gain values according to a gain control signal GC. Here, the charge pump 220 may be configured to adjust its gain value. In some embodiments, the charge pump 220 may transform the power voltage of the branch node BN with any one of a plurality of gain values according to the gain control signal GC to output the transformed power voltage. In some embodiments, the charge pump 220 may include capacitors and switches connected to the capacitors. The switches may be turned on in response to the gain control signal GC, and the gain value may be adjusted by changing a connection relationship between the capacitors. For example, the gain value of the charge pump 220 may be selected from any one of −0.5 times, −1 times, and −1.5 times. As another example, the gain value of the charge pump 220 may be selected from any one of −0.33 times, −0.66 times, and −1.33 times.

The regulator 230 may be connected between the charge pump 220 and the third output node ON3. The regulator 230 may regulate the power voltage transformed by the charge pump 220 in response to a regulator control signal RC. The regulator 230 may include at least one of a plurality of regulators known in the art. In some embodiments, the regulator 230 may include a low-dropout (LDO) regulator. The regulator 230 may output the regulated voltage as the third output voltage VO3 to the third output node ON3.

The gain control signal GC and the regulator control signal RC may be included in the power control signal PAS transmitted from the driver integrated circuit 120 to the PMIC 130 (refer to FIG. 1).

When it is required to increase the level of the third output voltage VO3 or the magnitude (or absolute value) of the level of the third output voltage VO3, the power voltage of the branch node BN may not be boosted by the DC-DC converter 210, but rather the power voltage of the branch node BN may be transformed by the charge pump 220 to increase the level of the third output voltage VO3 or the magnitude thereof. As described above, since the charge pump 220 having an adjustable gain is connected to the third power channel PCH3, a voltage level of the third power channel PCH3 may be set or transformed independently of the first and second power channels PCH1 and PCH2. Accordingly, the power management integrated circuit 200 may efficiently consume power while generating the variable third output voltage VO3.

For example, even when a relatively high voltage level (or the magnitude of the level) is required for the third power channel PCH3, the DC-DC converter 210 may generate a relatively low power voltage, and the generated power voltage may be output to the first and second power channels PCH1 and PCH2 without regulating (e.g., without being regulated). Accordingly, power consumption in the first and second power channels PCH1 and PCH2 may be relatively low. For example, when a relatively low voltage level (or the magnitude of the level) is required for the third power channel PCH3, a voltage input to the regulator 230 may have a reduced level (or the magnitude of the level) by lowering the gain value of the charge pump 220, Accordingly, power consumption in the third power channel PCH3, in particular, power consumption of the regulator 230 can be reduced. As such, power consumption of the power management integrated circuit 200 and/or the display device 100 (refer to FIG. 1) can be reduced.

Figure 3:
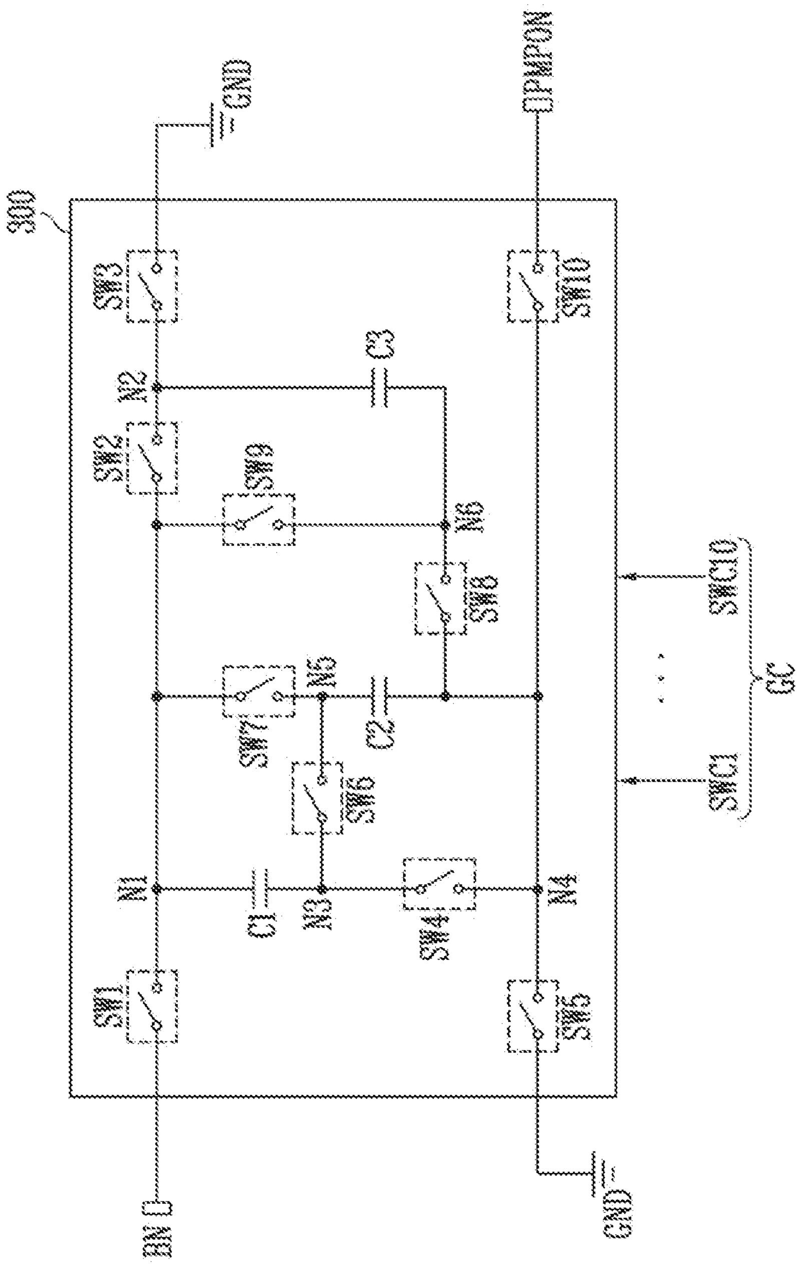
FIG. 3 is a circuit diagram illustrating an embodiment of a charge pump of FIG. 2.

FIG. 3 is a circuit diagram illustrating an embodiment of a charge pump of FIG. 2.

Referring to FIG. 3, a charge pump 300 may be connected between the branch node BN (refer to FIG. 2) and a pump output node PMPON, The pump output node PMPON may be connected to the regulator 230 of FIG. 2.

The charge pump 300 may Include first, second and third capacitors C1, C2 and C3 and first, second, third, fourth, fifth, sixth, seventh, eighth, ninth and tenth switches SW1, SW2, SW3, SW4, SW5, SW6, SW7, SW8, SW9 and SW10 connected to the first to third capacitors C1 to C3.

The first switch SW1 may be connected between the branch node BN and a first node N1. The second switch SW2 may be connected between the first node N1 and a second node N2. The third switch SW3 may be connected between the second node N2 and a ground node GND. The first to third switches SW1 to SW3 may be turned on or turned off in response to first, second and third switch control signals SWC1, SWC2 and SWC3, respectively.

The first capacitor C1 may be connected between the first node N1 and a third node N3. The fourth switch SW4 may be connected between the third node N3 and a fourth node N4. The fifth switch SW5 may be connected between the fourth node N4 and the ground node GND. The sixth switch SW6 may be connected between the third node N3 and a fifth node N5. The fourth to sixth switches SW4 to SW6 may be turned on or turned off in response to fourth, fifth and sixth switch control signals SWC4, SWC5 and SWC6, respectively.

The second capacitor C2 may be connected between the fifth node N5 and the fourth node N4. The seventh switch SW7 may be connected between the first node N1 and the fifth node N5. The eighth switch SW8 may be connected between the fourth node N4 and a sixth node N6. The ninth switch SW9 may be connected between the first node N1 and the sixth node N6. The seventh to ninth switches SW7 to SW9 may be turned on or turned off in response to seventh, eighth and ninth switch control signals SWC7, SWC8 and SWC9, respectively.

The third capacitor C3 may be connected between the second node N2 and the sixth node N6. The tenth switch SW10 may be connected between the fourth node N4 and the pump output node PMPON. The tenth switch SW10 may be turned on or turned off in response to a tenth switch control signal SWC10.

The first to third capacitors C1 to C3 may have substantially the same capacitance. The first to tenth switch control signals SWC1 to SWC10 may be included in the gain control signal GC of FIG. 2.

Through this circuit structure, the charge pump 300 may transform the power voltage of the branch node BN with any one gain value among −0.5 times, −1 times, and −1.5 times and output the transformed power voltage to the pump output node PMPON. This will be described in more detail with reference to FIGS. 4A, 4B, 5A, 5B, 6A, and 6B.

In addition to the charge pump 300 of FIG. 3, the charge pump 220 of FIG. 2 may be changed to various circuit structures having an adjustable gain. For example, the ripple of the voltage output through the pump output node PMPON may be reduced by the regulator 230 (see FIG. 2), but the charge pump 220 may further include a capacitor connected between the branch node BN and the ground node GND and a capacitor connected between the pump output node PMPON and the ground node GND to further reduce such ripple.

Figure 4A:
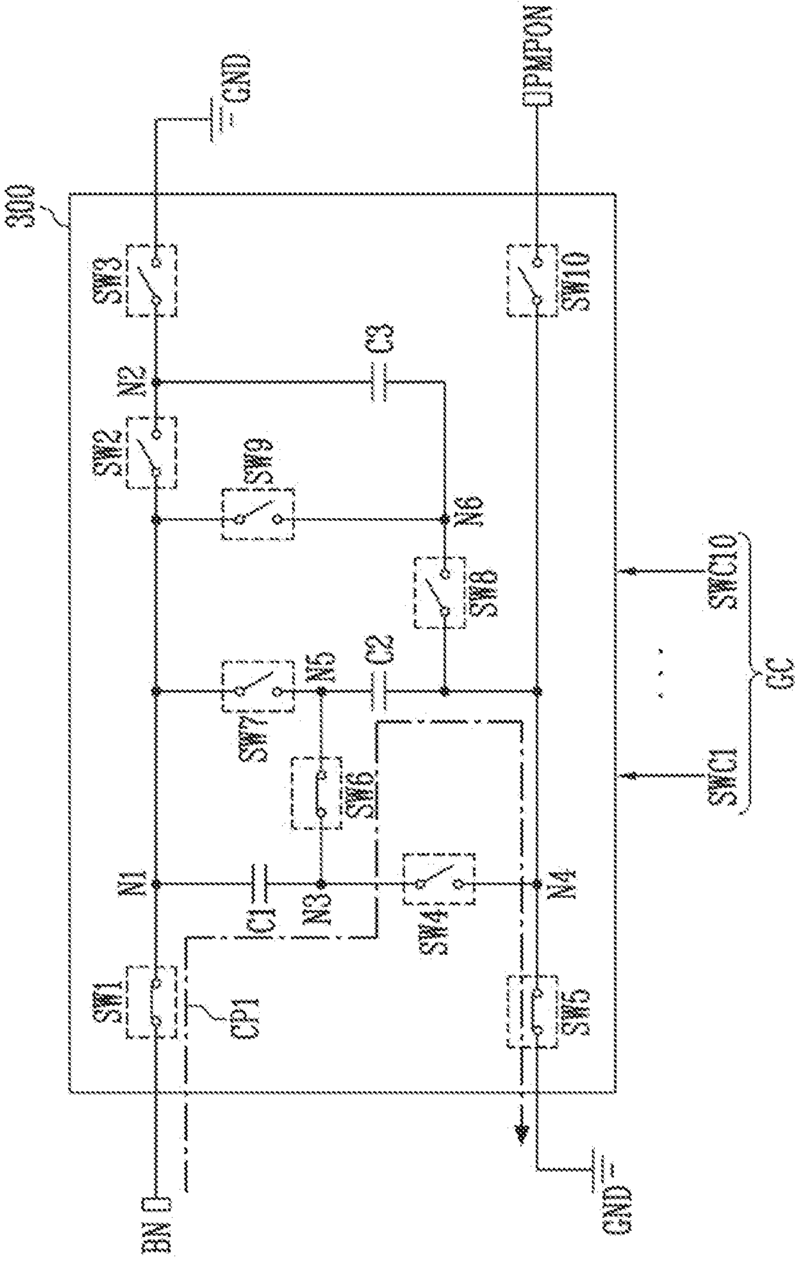
FIG. 4A is a circuit diagram illustrating states of switches of the charge pump that are charged when the charge pump of FIG. 3 transforms a branch node voltage with a gain value of −0.5 times.
Figure 4B:
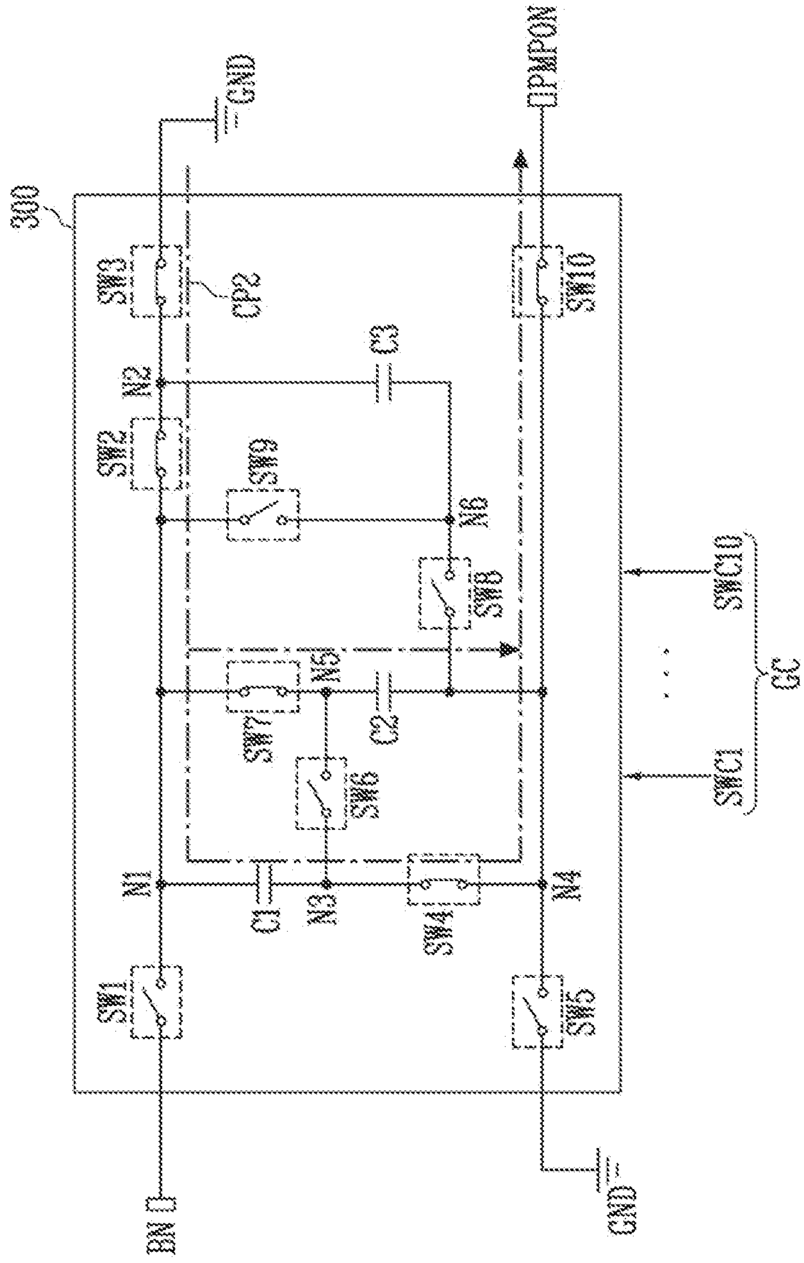
FIG. 4B is a circuit diagram illustrating states of the switches of the charge pump that output a charged voltage when the charge pump of FIG. 3 transforms the branch node voltage with a gain value of −0.5 times.

FIG. 4A is a circuit diagram illustrating states of switches of the charge pump that are charged when the charge pump of FIG. 3 transforms a branch node voltage with a gain value of −0.5 times, FIG. 4B is a circuit diagram illustrating states of the switches of the charge pump that output a charged voltage when the charge pump of FIG. 3 transforms the branch node voltage with a gain value of −0.5 times.

First, referring to FIG. 4A, the first switch SW1, the sixth switch SW6, and the fifth switch SW5 may be turned on to form a first current path CP1. This is illustrated in FIG. 4A by showing that the first switch SW1, the sixth switch SW6, and the fifth switch SW5 are each closed. Accordingly, the first and second capacitors C1 and C2 may be connected in series between the branch node BN and the ground node GND to charge the power voltage of the branch node BN. Accordingly, each of the first and second capacitors C1 and C2 may be charged with a voltage corresponding to half the power voltage of the branch node BN. Subsequently, referring to FIG. 4B, the third switch SW3, the second switch SW2, the seventh switch SW7, the fourth switch SW4, and the tenth switch SW10 may be turned on to form a second current path CP2. This is illustrated in FIG. 4B by showing that the third switch SW3, the second switch SW2, the seventh switch SW7, the fourth switch SW4, and the tenth switch SW10 are each closed. Accordingly, the first capacitor C1 and the second capacitor C2 may be connected in parallel between the ground node GND and the pump output node PMPON to discharge the charged charges along the second current path CP2, In this way, the charge pump 300 may transform the power voltage of the branch node BN with a gain value of −0.5 times and output the transformed power voltage to the pump output node PMPON.

Figure 5A:
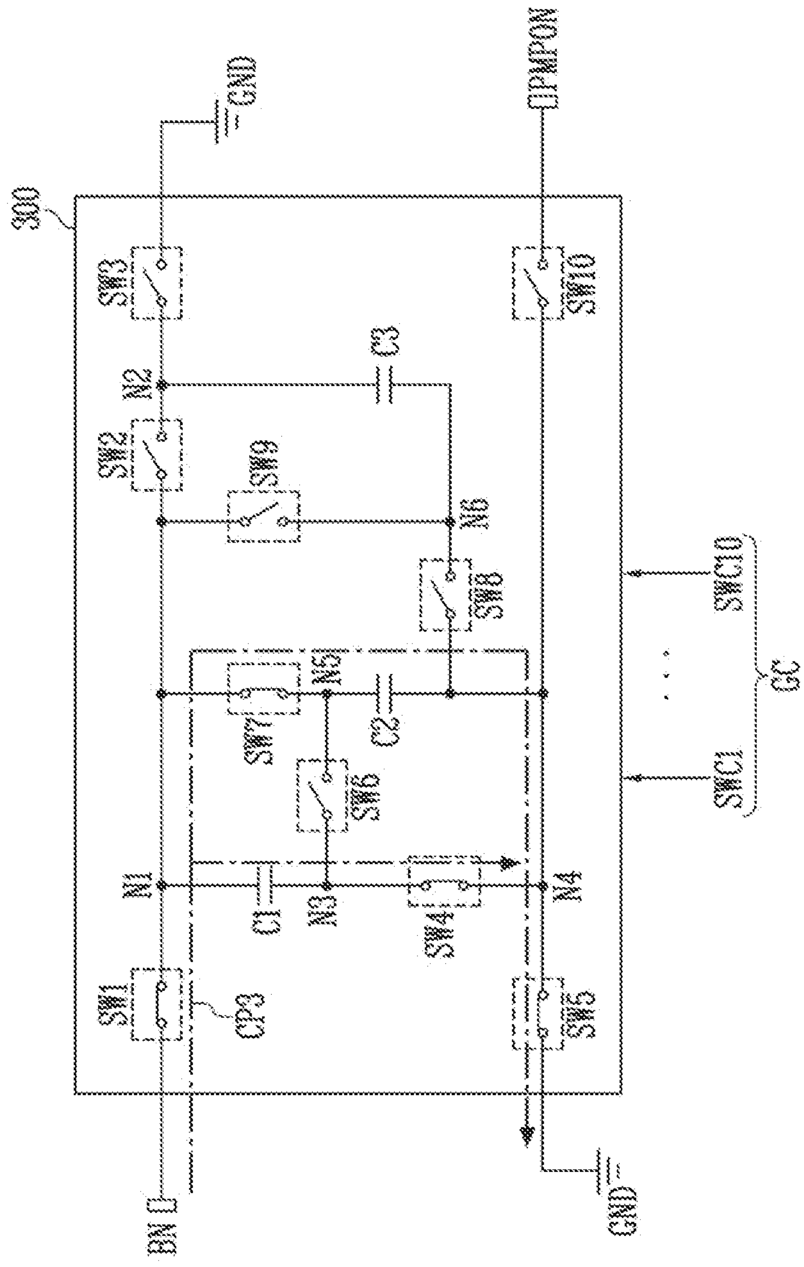
FIG. 5A is a circuit diagram illustrating states of the switches of the charge pump that are charged when the charge pump of FIG. 3 transforms the branch node voltage with a gain value of −1 times.
Figure 5B:
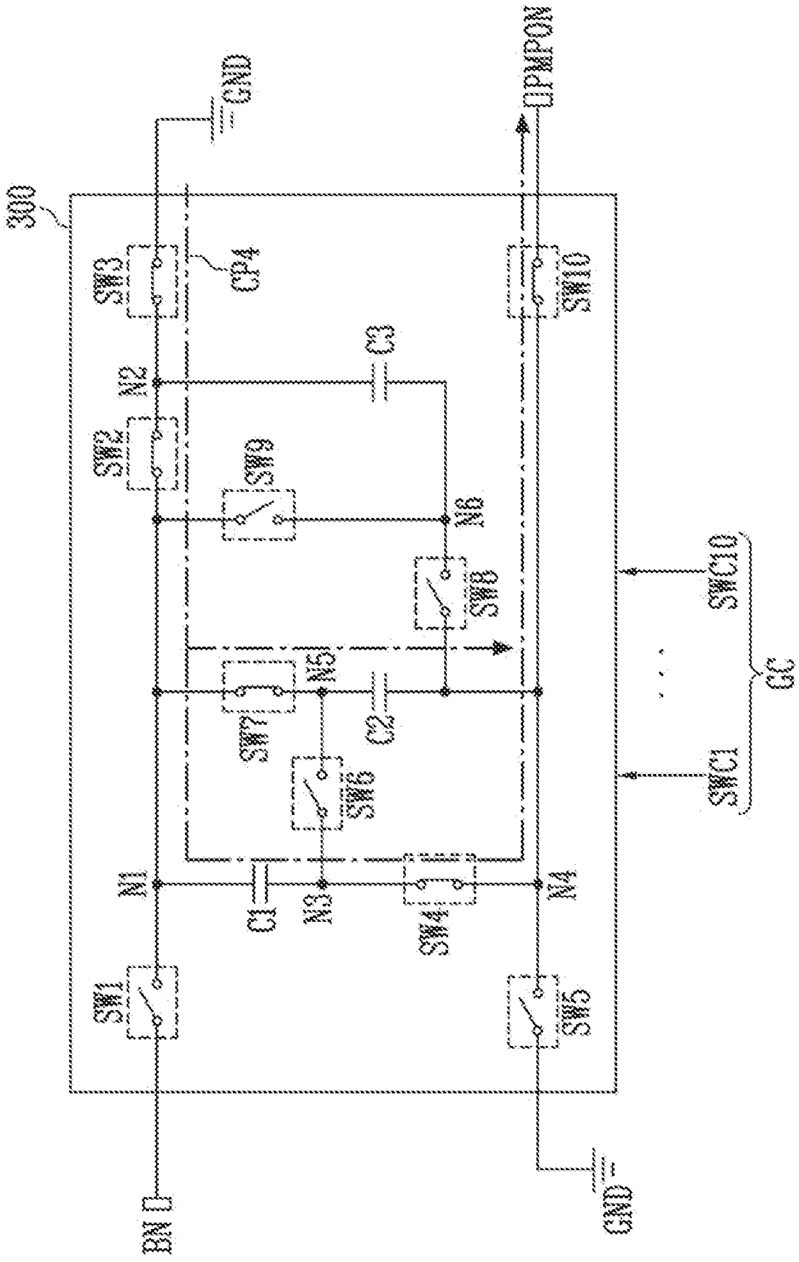
FIG. 5B is a circuit diagram illustrating states of the switches of the charge pump that output a charged voltage when the charge pump of FIG. 3 transforms the branch node voltage with a gain value of −1 times.

FIG. 5A is a circuit diagram illustrating states of the switches of the charge pump that are charged when the charge pump of FIG. 3 transforms the branch node voltage with a gain value of 4 times, FIG. 5B is a circuit diagram illustrating states of the switches of the charge pump that output a charged voltage when the charge pump of FIG. 3 transforms the branch node voltage with a gain value of −1 times.

First, referring to FIG. 5A, the first switch SW1, the fourth switch SW4, the seventh switch SW7, and the fifth switch SW5 may be turned on to form a third current path CP3. Accordingly, the first capacitor C1 and the second capacitor C2 may be connected in parallel between the branch node BN and the ground node GND to charge the power voltage of the branch node BN. Subsequently, referring to FIG. 53, the third switch SW3, the second switch SW2, the seventh switch SW7, the fourth switch SW4, and the tenth switch SW10 may be turned on to form a fourth current path CP4, Accordingly, the first and second capacitors C1 and C2 may be connected in parallel between the ground node GND and the pump output node PMPON. Accordingly, the charge pump 300 may transform the power voltage of the branch node BN with a gain value of −1 times and output the transformed power voltage to the pump output node PMPON.

Figure 6A:
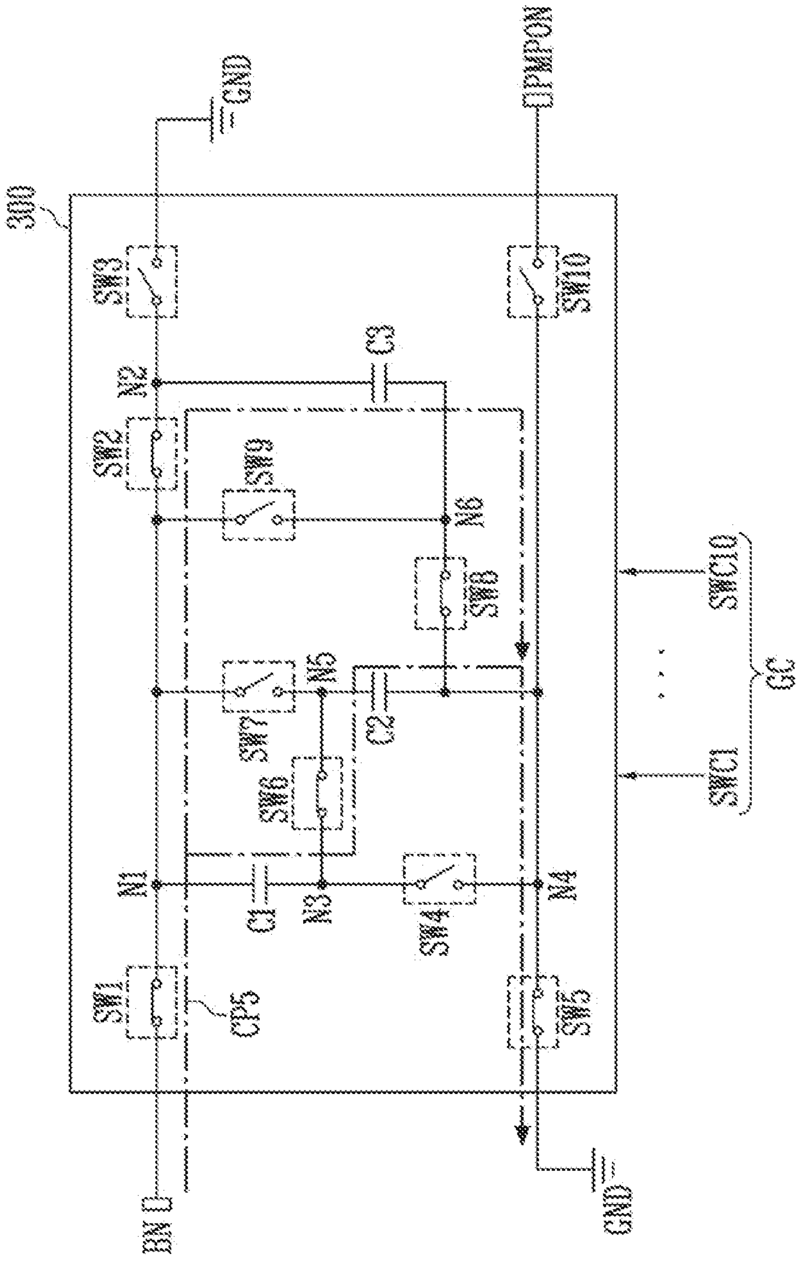
FIG. 6A is a circuit diagram illustrating states of the switches of the charge pump that are charged when the charge pump of FIG. 3 transforms the branch node voltage with a gain value of −1.5 times.
Figure 6B:
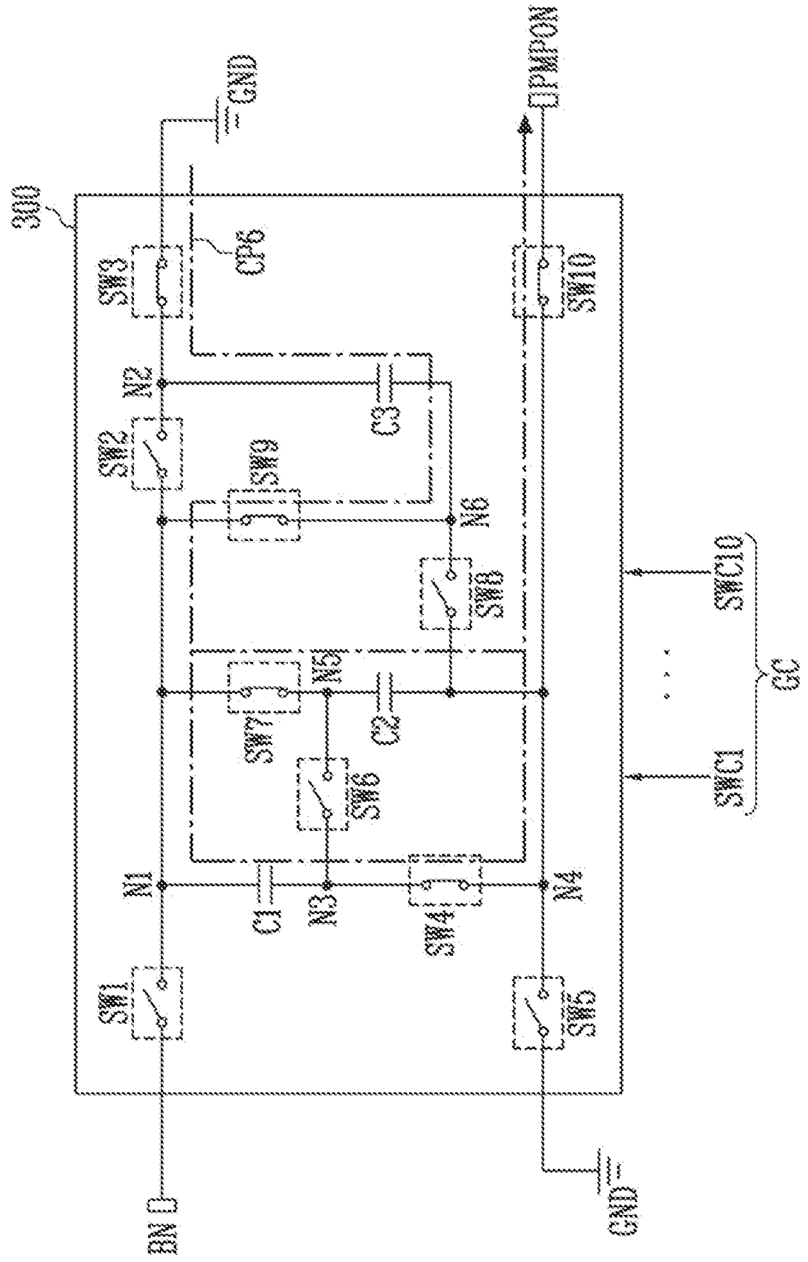
FIG. 6B is a circuit diagram illustrating states of the switches of the charge pump that output a charged voltage when the charge pump of FIG. 3 transforms the branch node voltage with a gain value of 4.5 times.

FIG. 6A is a circuit diagram illustrating states of the switches of the charge pump that are charged when the charge pump of FIG. 3 transforms the branch node voltage with a gain value of −1.5 times, FIG. 6B is a circuit diagram illustrating states of the switches of the charge pump that output a charged voltage when the charge pump of FIG. 3 transforms the branch node voltage with a gain value of −1.5 times.

First, referring to FIG. 6A, the first switch SW1, the sixth switch SW6, the second switch SW2, the eighth switch SW8, and the fifth switch SW5 may be turned on to form a fifth current path CP5. This is illustrated in FIG. 6A by showing that the first switch SW1, the sixth switch SW6, the second switch SW2, the eighth switch SW8 and the fifth switch SW5 are each closed. The first and second capacitors C1 and C2 may be connected in series between the branch node BN and the ground node GND, and the first and second capacitors C1 and C2 and the third capacitor C3 may be connected in parallel between the branch node BN and the ground node GND. Subsequently, referring to FIG. 6B, the third switch SW3, the ninth switch SW9, the seventh switch SW7, the fourth switch SW4, and the tenth switch SW10 may be turned on to form a sixth current path CP6. This is illustrated in FIG. 63 by showing that the third switch SW3, the ninth switch SW9, the seventh switch SW7, the fourth switch SW4, and the tenth switch SW10 are each closed. Accordingly, the third capacitor C3 may be connected between the ground node GND and the first node N1, and the first and second capacitors C1 and C2 may be connected in parallel between the first node N1 and the pump output node PMPON. Accordingly, the charge pump 300 may transform the power voltage of the branch node BN with a gain value of −1.5 times and output the transformed power voltage to the pump output node PMPON.

Figure 7:
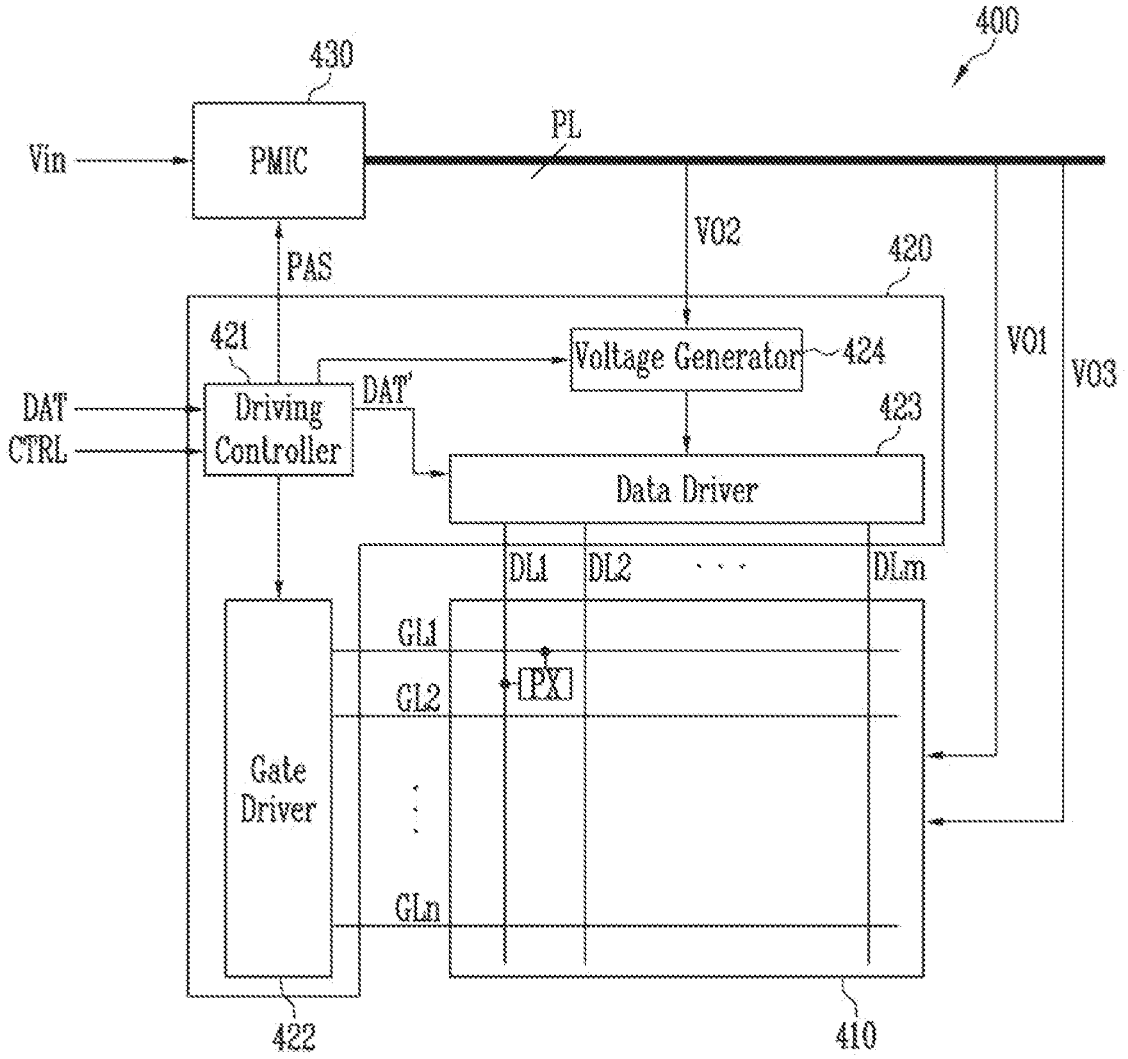
FIG. 7 is a block diagram illustrating an embodiment of the display device of FIG. 1.
Figure 8:
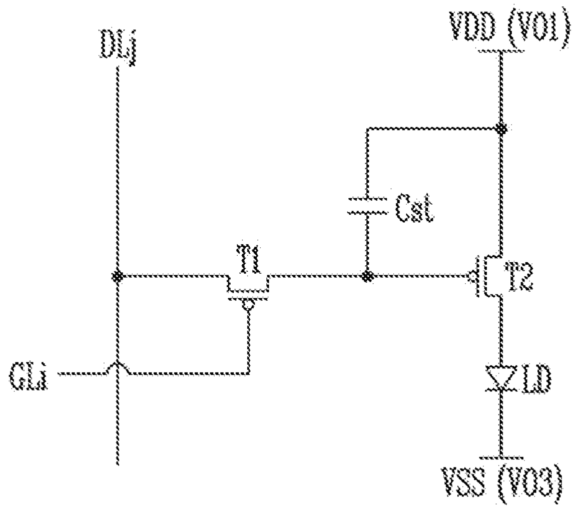
FIG. 8 is a circuit diagram illustrating an embodiment of one of pixels of FIG. 7.

FIG. 7 is a block diagram illustrating an embodiment of the display device of FIG. 1. FIG. 8 is a circuit diagram illustrating an embodiment of one of pixels of FIG. 7.

Referring to FIG. 7, a display device 400 may include a display panel 410, a driver integrated circuit 420, and a power management integrated circuit 430.

The display panel 410 may include pixels PX. The pixels PX may be connected to a gate driver 422 through first to n-th gate lines GL1 to GLn extending in a row direction, and may be connected to a data driver 423 through first to m-th data lines DL1 to DLm extending in a column direction. The first to m-th data lines DL1 to DLm and the first to n-th gate lines GL1 to GLn may be included in the signal lines SL of FIG. 1.

The display panel 410 may be at least one of various display panels such as a light emitting diode (LED) panel, a liquid crystal display (LCD) panel, an electrophoretic display panel, an electrowetting display panel, and the like. Hereinafter, an embodiment in which the display panel 410 is a light emitting diode panel and the pixels PX include light emitting diodes will be described as an example. However, embodiments of the present invention are not limited thereto, and the display panel 410 may be another type of display panel.

In the display panel 410, each of the pixels PX may include a light emitting diode. A pixel connected to a j-th data line DLj and an i-th gate line GLi is shown FIG. 8, where i may be a natural number less than or equal to m, and j may be a natural number less than or equal to n. Referring to FIG. 8, the pixel may include a first transistor T1, a second transistor T2, a capacitor Cst, and a light emitting diode LD. The first transistor T1 may be connected between the data line DLj and one end of the capacitor Cst, and a gate of the first transistor T1 may be connected to the gate line GLi. The capacitor Cst may have one end connected to the first transistor T1 and another end connected to a first power voltage node VDD. The second transistor T2 may be connected between the first power voltage node VDD and the light emitting diode LD, and a gate of the second transistor T2 may be connected to one end of the capacitor Cst. The light emitting diode LD may include an anode electrode connected to the second transistor T2 and a cathode electrode connected to a second power voltage node VSS. The light emitting diode LD may include an inorganic light emitting diode and/or an organic light emitting diode.

The first transistor T1 may output a voltage input through the data line DLj to one end of the capacitor Cst in response to a gate-on voltage input through the gate line GLi. Accordingly, the capacitor Cst may be charged with charges corresponding to a difference between a voltage received through the first transistor T1 and a voltage of the first power voltage node VDD. The second transistor T2 may be turned on by the charges charged in the capacitor Cst. The voltage of the first power voltage node VDD may have a positive voltage level, and a voltage of the second power voltage node VSS may have a negative voltage level. When the second transistor T2 is turned on, a current may flow from the first power voltage node VDD to the second power voltage node VSS through the light emitting diode LD, so that the light emitting diode LD may emit light. The amount of current flowing through the second transistor T2 may be determined according to the amount of charges charged in the capacitor Cst.

FIG. 8 shows an embodiment in which the pixel includes two transistors T1 and T2 and one capacitor Cst. However, this is only an example, and the pixel may have various circuit structures for controlling the light emitting diode LD. For example, the pixel may include seven transistors and one capacitor for controlling the light emitting diode LD.

Referring back to FIG. 7, the driver integrated circuit 420 may include a driving controller 421, the gate driver 422, the data driver 423, and a voltage generator 424.

The driving controller 421 may control overall operations of the display device 400. The driving controller 421 may receive image data DAT and control signals CTRL for controlling display of the display device 400 from the outside. The driving controller 421 may provide image signal data DAT' to the data driver 423 by adjusting the ti ling of the image data DAT based on the control signals CTRL. In addition, the driving controller 421 may control the gate driver 422, the data driver 423, and the voltage generator 424 based on the control signals CTRL to display the image signal data DAT' on the display panel 410.

The gate driver 422 may drive the first to n-th gate lines GL1 to GLn in response to the control of the driving controller 421. In some embodiments, the gate driver 422 may be implemented as a circuit using an amorphous silicon gate (ASG) using an amorphous silicon thin film transistor a-Si TFT, an oxide semiconductor, a crystalline semiconductor, a polycrystalline semiconductor, or the like.

The data driver 423 may drive the first to m-th data lines DL1 to DLm in response to the control of the driving controller 421. The data driver 423 may apply grayscale voltages corresponding to the image signal data DAT' to the first to m-th data lines DL1 to DLm by using a voltage provided from the voltage generator 424.

When each of the gate lines GL1 to GLn is driven with a gate-on voltage by the gate driver 422, the grayscale voltages corresponding to the image signal data DAT' may be applied to the data lines DL1 to DLm by the data driver 423. Accordingly, the grayscale voltages corresponding to the image signal data DAT may be provided to the pixels PX of a corresponding gate line, and the pixels PX may output light having a luminance corresponding to the grayscale voltages. Accordingly, an image may be displayed on the display panel 410.

The voltage generator 424 may be operated in response to the control of the driving controller 421. The voltage generator 424 may receive the second output voltage VO2 (refer to FIG. 2) through the power lines PL, and may generate various driving voltages necessary to operate the display panel 410 using the received second output voltage VO2. For example, the voltage generator 424 may generate a gamma voltage using the second power voltage VO2 and provide the generated gamma voltage to the data driver 423.

The power management integrated circuit 430 may receive the input voltage Vin from the outside. The power management integrated circuit 430 may generate the power voltages using the received input voltage Vin, and output the generated power voltages through the power lines PL. The power management integrated circuit 430 may receive the power control signal PAS from the driving controller 421 of the driver integrated circuit 420. The power management integrated circuit 430 may be configured similarly to the power management integrated circuit 200 of FIG. 2. Hereinafter, duplicate descriptions will be omitted.

The second output node ON2 (refer to FIG. 2) of the power management integrated circuit 430 may be connected to the voltage generator 424. Accordingly, the second output voltage VO2 may be provided to the voltage generator 424. In addition, the first and third output nodes ON1 and ON3 (refer to FIG. 2) of the power management integrated circuit 430 may be connected to the display panel 410, and the first and third output voltages VO1 and VO3 may be provided to the display panel 410.

The first output voltage VO1 may be provided to the first power voltage node VDD of FIG. 8. The third output voltage VO3 may be provided to the second power voltage node VSS of FIG. 8. The first output voltage VO1 may have a positive voltage level. For example, the first output voltage VO1 may be 3.0V. The third output voltage VO3 may be in a negative voltage range. The third output voltage VO3 may be varied as described with reference to FIG. 2. For example, the third output voltage VO3 may be varied among −1.4V, −2.8V, and −3.7V.

The display device 400 may support a plurality of luminance modes, and one of the plurality of luminance modes may be selected. In some embodiments, the control signals CTRL received by the driving controller 421 may include data indicating the selected luminance mode, and the driving controller 421 may select the luminance mode based on the control signals CTRL. In addition, one of the plurality of luminance modes may be selected through various other methods. The driving controller 421 may control the power management integrated circuit 430 according to the selected luminance mode to adjust the level of the third output voltage VO3.

In a low luminance mode, the magnitude (or absolute value) of the level of the third output voltage VO3 may be required to be relatively small. The driving controller 421 may transmit the gain control signal GC (refer to FIG. 2) to the charge pump 220 of the power management integrated circuit 430 to reduce the magnitude (or absolute value) of the gain of the charge pump 220. For example, when a voltage level of the branch node BN (refer to FIG. 2) is 3.0V, the gain of the charge pump 220 may be adjusted to −0.5 so that the charge pump 220 may output a voltage of −1.5V. In this case, the voltage of −1.5V may be regulated by the regulator 230 (refer to FIG. 2) so that a voltage of −1.4V may be output as the third output voltage VO3. Accordingly, a difference between the first output voltage VO1 of the first power voltage node VDD of FIG. 8 and the third output voltage VO3 of the second power voltage node VSS of FIG. 8 may be reduced, and the light emitting diode LD may generate light having a relatively low luminance. As such, in the low luminance mode, the charge pump 220 may be controlled such that the magnitude of the gain is reduced. Accordingly, a voltage applied to both ends of the regulator 230 may be lowered, thereby reducing power consumption.

In a high luminance mode, the magnitude (or absolute value) of the level of the third output voltage VO3 may be required to be relatively large. The driving controller 421 may increase the magnitude (or absolute value) of the gain of the charge pump 220 by transmitting the gain control signal GC to the charge pump 220. For example, when the voltage level of the branch node BN is 3.0V, the gain of the charge pump 220 may be adjusted to −1.5 so that the charge pump 220 may output a voltage of −4.5V. In this case, the voltage of −4.5V may be regulated by the regulator 230 so that, for example, a voltage of −3.7V may be output as the third output voltage VO3. Accordingly, the difference between the first output voltage VO1 of the first power voltage node VDD of FIG. 8 and the third output voltage VO3 of the second power voltage node VSS of FIG. 8 may be increased, and the light emitting diode LD may generate light having a relatively high luminance. As such, in the high luminance mode, the charge pump 220 may be controlled such that the magnitude of the gain is increased to generate the third output voltage VO3. This means that the third output voltage VO3 can be controlled independently of the first and second output voltages VO1 and VO2. For example, in the high luminance mode, operations of boosting the power voltage output from the DC-DC converter 210 (refer to FIG. 2) to generate the third output voltage VO3 or reducing the boosted power voltage again to provide the first and second output voltages VO1 and VO2 may not be required. In this way, power consumption can be reduced even in the high luminance mode, FIG. 9 is a block diagram illustrating another embodiment of the power management integrated circuit of FIG. 1.

Figure 9:
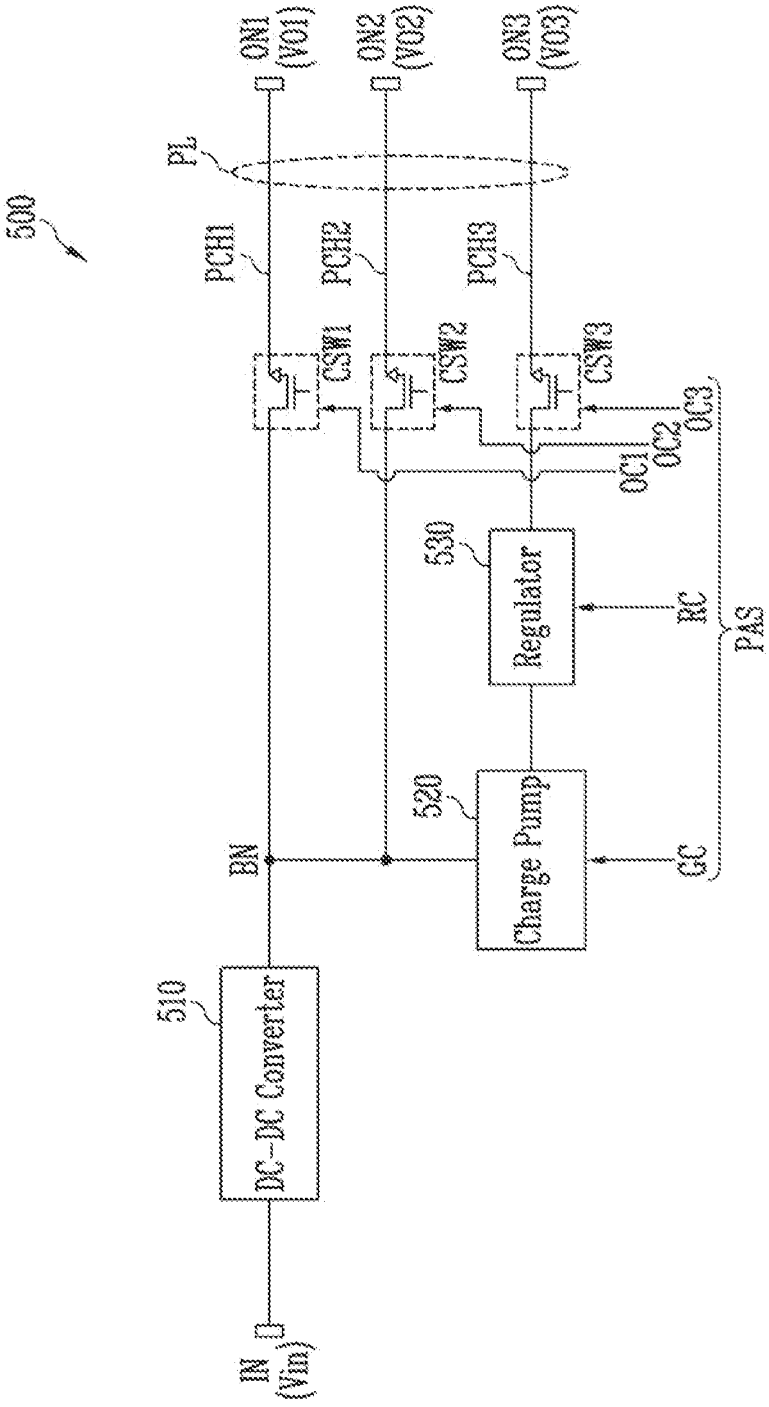
FIG. 9 is a block diagram illustrating another embodiment of the power management integrated circuit of FIG. 1.

Referring to FIG. 9, a power management integrated circuit 500 may include a DC-DC converter 510, a charge pump 520, a regulator 530, and first, second and third channel switches CSW1, CSW2 and CSW3.

The DC-DC converter 510, the charge pump 520, and the regulator 530 may be configured similarly to the DC-DC converter 210, the charge pump 220, and the regulator 230 of FIG. 2, respectively. Hereinafter, duplicate descriptions will be omitted.

The first to third channel switches CSW1 to CSW3 may be provided in association with the first to third power channels PCH1 to PCH3, respectively. In other words, the first channel switch CSW1 may be provided with the first power channel PCH1, the second channel switch CSW2 may be provided with the second power channel PCH2 and the third channel switch CSW3 may be provided with the third power channel PCH3. The power control signal PAS from the driver integrated circuit 120 of FIG. 1 may further include first, second and third output control signals OC1, OC2 and OC3. The first to third channel switches CSW1 to CSW3 may be turned on or turned off in response to the first to third output control signals OC1 to OC3, respectively. The first channel switch CSW1 may be connected between a branch node BN and a first output node ON1. The second channel switch CSW2 may be connected between the branch node BN and a second output node ON2, The third channel switch CSW3 may be connected between the regulator 530 and a third output node ON3. Each of the first to third channel switches CSW1 to CSW3 may include an NMOS transistor and/or a PMOS transistor.

The driver integrated circuit 120 may control the sequence or timing in which the first to third output voltages VO1 to VO3 are supplied by switching the first to third channel switches CSW1 to CSW3. Accordingly, the power management integrated circuit 500 may be applied to various embodiments of the display device.

Figure 10:
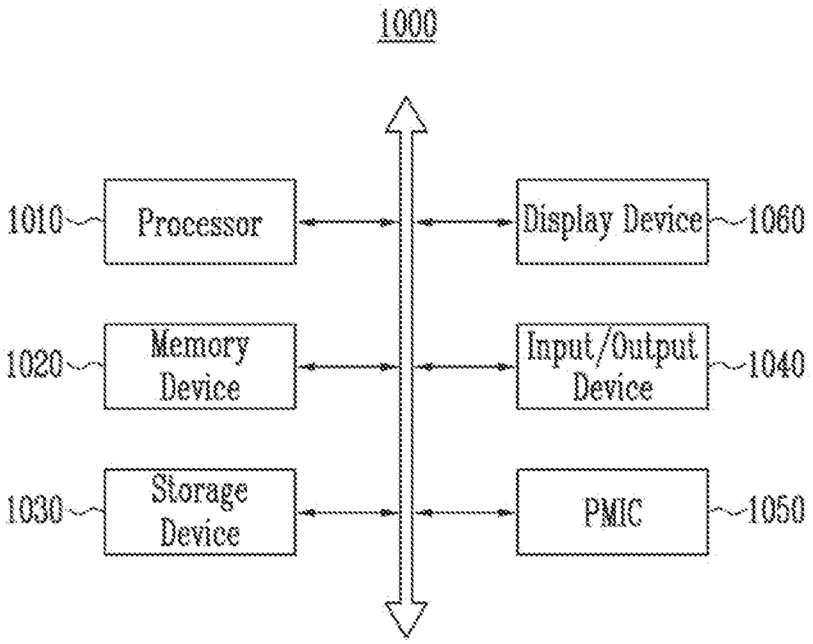
FIG. 10 is a block diagram illustrating a display system according to embodiments of the present invention.

FIG. 10 is a block diagram illustrating a display system according to embodiments of the present invention.

Referring to FIG. 10, a display system 1000 may include a processor 1010, a memory device 1020, a storage device 1030, an input/output device 1040, a power management integrated circuit 1050, and a display device 1060.

The processor 1010 may perform various tasks and calculations. In some embodiments, the processor 1010 may include an application processor, a graphic processing unit, a microprocessor, a central processing unit (CPU), and the like. The processor 1010 may be connected to other components of the display system 1000 through a bus system. In some embodiments, the bus system may include a Peripheral Component Interconnect (PCI) bus. The processor 1010 may transmit the image data DAT and the control signals CTRL of FIG. 1 to the display device 1060 to display an image on the display device 1060.

The memory device 1020 may be provided as a working memory and/or a buffer memory of the display system 1000 and/or the processor 1010. In some embodiments, the memory device 1020 may include volatile memory devices such as dynamic random access memory (DRAM), static random access memory (SRAM), mobile DRAM, and the like.

The storage device 1030 may write data and read data in response to the control of the processor 1010. The storage device 1030 may include a nonvolatile storage medium that retains data even when the power of the display system 1000 is cut off. In some embodiments, the storage device 1030 may include a solid state drive (SSD), a hard disk drive (HDD), or the like.

The input/output device 1040 may include user input devices such as a keyboard, a keypad, a touch pad, a touch screen, and a mouse, and output devices such as a speaker and a printer.

The power management integrated circuit 1050 may supply power necessary to operate the display system 1000, In some embodiments, the power management integrated circuit 1050 may receive an input voltage from a battery included in the display system 1000 and supply the power using the input voltage.

The display device 1060 may display an image in response to the control of the processor 1010. The display device 1060 may be configured similarly to the display devices 100 and 400 of FIG. 1 and/or FIG. 7 except that the power management integrated circuit 130 of FIG. 1 is not included. The display device 1060 may receive the image data DAT (refer to FIGS. 1 and 7) and the control signals CTRL (refer to FIGS. 1 and 7), and display the image data DAT on the display panels 110 and 410 (refer to FIGS. 1 and 7) based on the control signals CTRL, In this case, the power management integrated circuit 1050 disposed outside the display device 1060 may perform the same functions as the power management integrated circuits 130 and 430 of FIG. 1 and/or FIG. 7. The display device 1060 may receive power voltages from the power management integrated circuit 1050 through power lines PL, and transmit a power control signal PAS (refer to FIGS. 1 and 7) to the power management integrated circuit 1050 to adjust at least one of the power voltages.

According to an embodiment, the display system 1000 may be a display system that operates using power from a battery, such as a portable computer, a mobile phone, or a wearable device.

As described above, embodiments of the present invention have been described with reference to the detailed description and the drawings. However, those skilled in the art or those of ordinary skill in the art will appreciate that various modifications and changes to the embodiments are possible without departing from the spirit and technical scope of the present invention as set forth in the claims below.

Therefore, the present invention is not limited to the embodiments described herein.

What is claimed is:

1. A power voltage supply circuit for a display device comprising:
- a branch node;
- a voltage converter having an output terminal connected to the branch node, the voltage converter configured to convert an input voltage received from outside, and output a power voltage to the branch node;
- a first output node connected to the branch node and configured to output the power voltage;
- a second output node connected to the branch node; and
- a charge pump connected between the branch node and the second output node and configured to transform the power voltage with different gain values in response to a control signal.

2. The power voltage supply circuit of claim 1, wherein the power voltage of the branch node is output to the first output node without being regulated.

3. The power voltage supply circuit of claim 1, further comprising:
- a regulator connected between the charge pump and the second output node and configured to regulate a transformed power voltage and output an additional power voltage to the second output node.

4. The power voltage supply circuit of claim 3, further comprising:
- a first switch connected between the branch node and the first output node, wherein the first switch is turned on in response to a first output control signal; and
- a second switch connected between the regulator and the second output node, wherein the second switch is turned on in response to a second output control signal.

5. The power voltage supply circuit of claim 1, wherein the power voltage has a positive voltage level, and
- wherein the transformed power voltage has a negative voltage level.

6. The power voltage supply circuit of claim 1, wherein the charge pump includes capacitors and switches connected to the capacitors, and wherein each of the switches is turned on or turned off in response to the control signal, and a gain value is adjusted by changing a connection relationship between the capacitors.

7. A display device comprising:

a display panel;

a driver integrated circuit connected to the display panel through a plurality of signal lines and configured to drive the display panel; and a power voltage supply circuit configured to provide power voltages to at least one of the display panel and the driver integrated circuit, wherein the power voltage supply circuit includes:

a voltage converter configured to convert an input voltage and output a first power voltage to a branch node;

a first output node connected to the branch node to output the first power voltage;

a second output node connected to the branch node; and a charge pump connected between the branch node and the second output node and configured to transform the first power voltage with an adjustable gain value, wherein a transformed first power voltage is output as a second power voltage through the second output node.

8. The display device of claim 7, wherein the second power voltage is supplied to the display panel through the second output node, and wherein the driver integrated circuit adjusts a luminance of the display panel by controlling a gain value of the charge pump to transform a level of the second power voltage.

9. The display device of claim 8, wherein the driver integrated circuit receives a control signal including data related to the luminance of the display panel from outside, and controls the gain value based on the control signal.

10. The display device of claim 7, wherein the display panel includes a plurality of pixels connected to the plurality of signal lines, wherein each of the plurality of pixels includes a light emitting diode, and wherein the second power voltage is provided to a first end of the light emitting diode through the second output node.

11. The display device of claim 10, wherein the first power voltage is provided to a second end of the light emitting diode through the first output node.

12. The display device of claim 11, wherein the first power voltage has a positive voltage level, and the second power voltage has a negative voltage level.

13. The display device of claim 7, wherein the driver integrated circuit includes a voltage generator configured to generate a driving voltage of the display device, and wherein the first power voltage is provided to the voltage generator through the first output node.

14. The display device of claim 7, wherein the power voltage supply circuit includes a power management integrated circuit (PMIC) disposed in an area separated from the driver integrated circuit.

15. The display device of claim 7, wherein the first power voltage of the branch node is output to the first output node without being regulated.

16. The display device of claim 7, wherein the power voltage supply circuit further includes a regulator connected between the charge pump and the second output node, wherein the regulator is configured to regulate the transformed first power voltage to generate the second power voltage.

17. The display device of claim 16, wherein the voltage converter includes a direct current (DC)-DC converter, and wherein the regulator includes a low-dropout (LDO) regulator.

18. A display system comprising:

a display device;

a processor configured to control the display device; and a power voltage supply circuit, wherein the power voltage supply circuit includes:

a voltage converter configured to convert an input voltage and output a first power voltage to a branch node;

a first output node connected to the branch node and configured to output the first power voltage;

a second output node connected to the branch node; and a charge pump connected between the branch node and the second output node and configured to transform the first power voltage with an adjustable gain value, wherein a transformed first power voltage is output as a second power voltage through the second output node, and wherein the first and second power voltages are provided to the display device through the first and second output nodes, respectively.

* * * * *